United States Patent [19]

Kobayashi et al.

[11] Patent Number: 5,022,630
[45] Date of Patent: Jun. 11, 1991

[54] PIPE CONNECTOR FOR A HIGH-PRESSURE FLUID PIPE

[75] Inventors: Yoshikazu Kobayashi; Takeaki Ooshio, both of Tokyo, Japan

[73] Assignee: Nitto Kohki Co., Ltd., Tokyo, Japan

[21] Appl. No.: 547,205

[22] Filed: Jul. 3, 1990

[51] Int. Cl.$^5$ .............................................. F16L 37/28
[52] U.S. Cl. ................................ 251/149.6; 251/149.7
[58] Field of Search ............................. 137/549, 550; 251/149.6, 149.7

[56] References Cited

U.S. PATENT DOCUMENTS

| | | | |
|---|---|---|---|
| 2,919,935 | 1/1960 | Nyberg | 251/149.6 |
| 3,474,827 | 10/1969 | Torres | 251/149.6 |
| 3,715,099 | 2/1973 | Shendure | 251/149.6 |
| 4,546,956 | 10/1985 | Moberg | 251/149.6 |
| 4,792,115 | 12/1988 | Jindra et al. | 251/149.6 |

Primary Examiner—A. Michael Chambers
Attorney, Agent, or Firm—Nixon & Vanderhye

[57] ABSTRACT

A pipe connector for a high-pressure fluid pipe comprises a socket and a plug. The socket includes a housing having a first end portion connected to a high-pressure fluid source, a second end portion receiving a plug, and a bore formed of a valve chamber located on the first end portion side and a plug hole located on the second end portion side, the bore connecting the first and second end portions. The housing includes a valve seat and a valve body disposed in the valve chamber, a sealing ring for sealing the gap between the outer peripheral surface of the valve body and the inner peripheral surface of the plug hole, and a passage adapted to connect the bore portion between the valve seat and the sealing ring to the bore portion on the second end portion side with respect to the sealing ring when the valve body is separated from the valve seat. The plug has a fluid passage capable of communicating with the pipe and at least one radial through hole adapted to communicate with the fluid passage when the plug is inserted in the plug hole. When the plug is inserted into the plug hole of the housing, the valve body is separated from the valve seat, so that a high-pressure fluid flows through the passage of the housing and the through hole and the fluid passage of the plug.

15 Claims, 2 Drawing Sheets

PIPE CONNECTOR FOR A HIGH-PRESSURE FLUID PIPE

BACKGROUND OF THE INVENTION

1. Field of the Invention

The present invention relates to a pipe connector adapted for use in releasably connecting a high-pressure fluid pipe.

2. Description of the Related Art

Various pipe connectors have conventionally been used to connect a vessel filled with a high-pressure fluid to another vessel or a pipe or to connect high-pressure fluid pipes to one another, for example. The basic construction of these pipe connectors is generally known. In the connector of a type in which a normally-closed valve is provided only on the socket side, a socket on the fluid-supply side and a plug on the pipe side are connected by pushing the valve open by means of the distal end of the plug to cause the respective flow passages of the socket and the plug to communicate with each other, so that the high-pressure fluid is introduced into the pipe for transportation.

In the socket through which the high-pressure fluid flows, however, the pressure of the fluid acts on the rear face of the valve body of the normally-closed valve, and also on the distal end face of the plug. In connecting the socket and the plug, therefore, these elements are subjected to a substantial thrust load. Accordingly, the socket and the plug can be connected only with use of a force great enough to resist the thrust load. If the outside diameter of the plug and the pressure of the high-pressure fluid are 6 mm and 70 kgf/cm$^2$, respectively, a force of approximately 19.79 kgf acts on the front end face portion of the plug, and also on the valve. It is not very easy for an operator, therefore, to push the plug into the socket so that the valve body is fully retreated against the pressure of the fluid.

Thus, according to the conventional high-pressure fluid connector, connecting the socket and the plug requires a great force, and sometimes cannot be accomplished by human strength. If the valve is opened without satisfactory connection, moreover, the fluid may unexpectedly rush out from the gap between the socket and the plug, thus involving a serious risk and lowering the operating efficiency. If the high-pressure fluid is discharged into the open air during the connecting operation, then it entails an unnecessary waste, as well as danger. Depending on the kind of the fluid handled, this problem may possibly develop into an issue of environmental pollution.

SUMMARY OF THE INVENTION

The object of the present invention is to provide a pipe connector of a type in which a valve is operated in connecting or disconnecting a connector housing and a plug, whereby the pressure of a high-pressure fluid is prevented from being applied to a distal end face portion of the plug to be connected, having a wide pressure receiving area, so that the connection or disconnection of the plug is facilitated, and the fluid is prevented from leaking out.

In order to achieve the above object, a pipe connector for a high-pressure fluid pipe according to the present invention is constructed so that a plug hole is formed at one open end portion of a housing the other open end portion of which can be connected to a high-pressure system, and a valve chamber is provided in the connection-side portion of the housing. The valve chamber contains a valve body, which is pushed open when a plug is fitted into the plug hole, and a valve seat in contact with the valve body. A sealing ring for sealing the outer peripheral surface of a valve stem portion of the obturating element is provided on the inner peripheral surface portion of the inner part of the plug hole. Formed outside the plug hole is flow passage which communicates with through holes in the lateral face portion of the plug when the plug is connected.

When the plug is inserted into the plug hole of the housing in connecting the housing and the plug, the outer peripheral surface of the plug is first sealed by means of an O-ring thereon or on the inner peripheral surface of the plug hole.

Meanwhile, the valve body in the housing is pressed to be retreated by the distal end portion of the plug. If the valve body goes away the shortest distance from the valve seat, thereby creating a gap, the housing-side flow passage communicating with the through holes in the lateral face portion of the plug is opened, so that a high-pressure fluid is guided to the outer peripheral side of the plug hole via the flow passage. Thus, the fluid can flow through the flow passage into the plug without having its pressure applied to the distal end face portion of the plug, so that the housing and the plug can be connected with ease.

Even after the plug is fully connected to the plug hole, the high-pressure fluid flows through the flow passage toward the plug, and this state is maintained thereafter.

When the plug is disengaged from the housing, the valve body comes into contact with the valve seat to close the opened flow passage.

In the pipe connector for a high-pressure fluid pipe according to the present invention, the fluid is detoured outside the plug hole, so that the plug is subjected to no or hardly any thrust load when it is connected or disconnected. According to the invention, therefore, the plug can be vary easily connected by human strength, and cannot rudely come off when it is disconnected. Thus, the pipe connector of the type in which the valve is automatically operated in connecting or disconnecting the plug can be made safer. Further, the high-pressure fluid can be prevented from being wastefully discharged into the open air during the plug connecting or disconnecting operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 and 2 show a pipe connector for a high-pressure fluid pipe according to a first embodiment of the present invention, in which:

FIG. 1 is a quarter-sectional side view of the first embodiment; and

FIG. 2 is a quarter-sectional side view of a second embodiment.

DETAILED DESCRIPTION OF THE PREFERRED EMBODIMENTS

Figure 1:
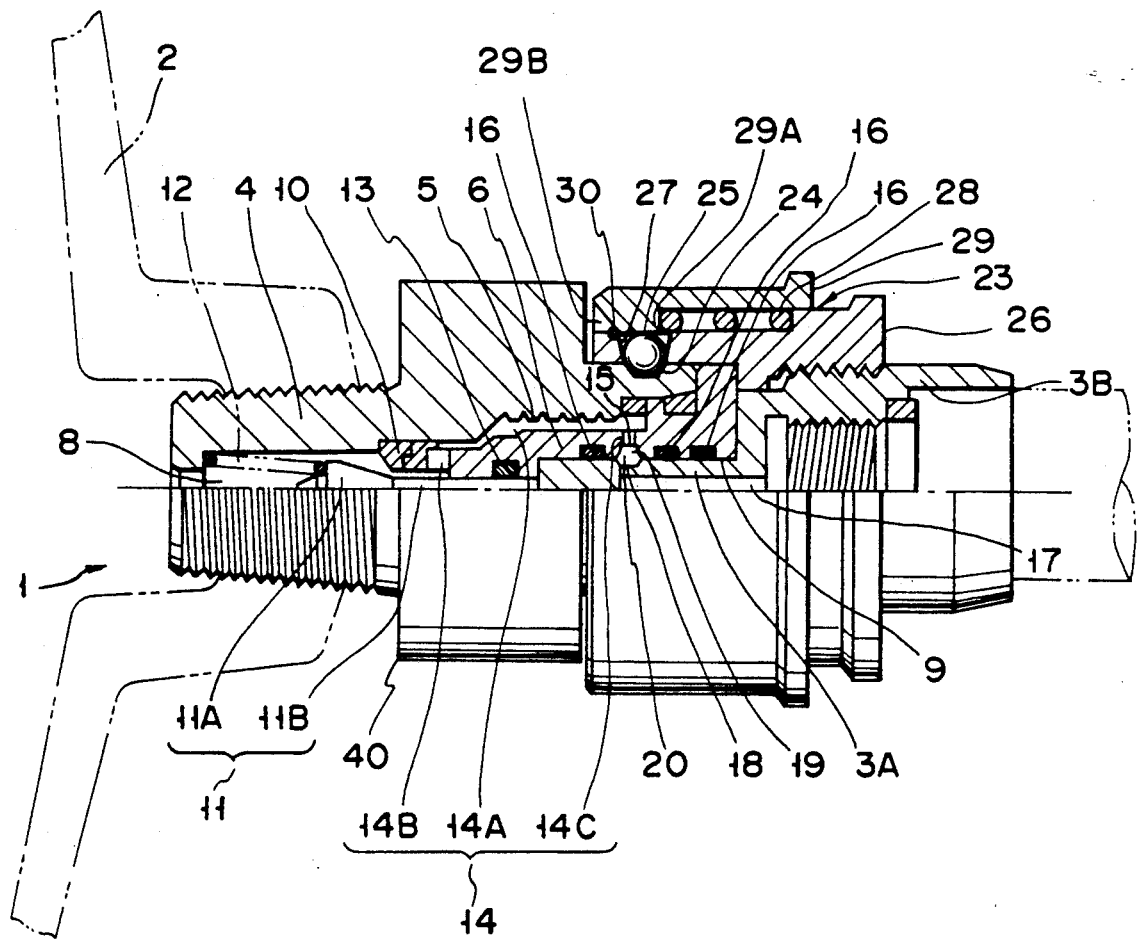

In FIG. 1, numeral 2 denotes a pressure vessel filled with a gas, such as carbon dioxide gas, under high pressure, and numeral 1 denotes a pipe connector for a high-pressure fluid pipe according to the present invention, which is fixed to a fluid outlet port of the vessel 2. A male screw (not shown) of an inner cylinder 6 is threadedly engaged with a female screw 5 formed on the inner peripheral surface of the front portion of an outer cylinder 4, thus constituting a housing 40. A valve chamber 8 is provided in the rear portion of the outer cylinder 4, and a hole 9 for receiving a fluid flowing pipe 3 is formed at an open end portion of the inner cylinder 6.

A sealable ring-shaped valve seat 10 is fixed to the inner part of the valve chamber 8, and an obturating element 11 is disposed facing the seat 10. The element 11 has a valve head portion 11A in the shape of a truncated cone, adapted to engage the valve seat 10, and a valve stem portion 11B extending from the head portion 11A and penetrating the seat 10. The stem portion 11B penetrates the inner cylinder 6 for sliding motion to reach the pipe hole 9. Numeral 12 denotes a compression coil spring for resiliently urging the valve head portion 11A toward the valve seat 10. An O-ring 13 is provided on the inner peripheral surface of the inner cylinder 6 which faces the valve stem portion 11B, whereby a high-pressure fluid is prevented from leaking along the stem portion 11B.

Numeral 14 denotes a flow passage defined between the outer and inner cylinders 4 and 6. The high-pressure fluid passed between the valve seat 10 and the valve head portion 11A is radially outwardly detoured from part of the valve stem portion 11B by means of the passage 14. The terminal of the passage 14 communicates with the plug hole 9. Numeral 15 denotes an opening formed in the inner wall surface of the hole 9. In the present embodiment, the flow passage 14 is composed of passages 14A, 14B and 14C. The passage 14A corresponds to a space formed by chamfering part of the male screw (not shown) of the inner cylinder 6 and defined by that surface of the outer cylinder 4 on which the female screw 5 is formed. The passage 14B radially outwardly guides the high-pressure fluid which has reached the passage 14A after passing between the valve seat 10 and the valve head portion 11A. The passage 14C guides the high-pressure fluid toward the opening 15.

Three O-rings 16 are fitted on the inner wall surface of the hole 9, one on one side of the opening 15 and the other two on the other side. The distal end side of the pipe or plug 3, i.e. high-pressure side, is sealed by means of the O-ring 13 for sealing the outer peripheral surface of the valve stem portion 11B and one of the O-rings 16. The proximal end side of the plug 3, i.e. low-pressure side, is sealed by means of the two other O-rings 16. This sealing mechanism serves to prevent the high-pressure fluid, discharged from the opening 15 toward the outer periphery of the plug 3, from leading out.

The fluid sleeve or plug 3 includes a front end cylinder portion 3A and a rear end cylinder portion 3B. The cylinder portion 3A is inserted in the inner cylinder 6 which has the plug hole 9. The cylinder portions 3A and 3B internally communicate with each other. Since the front end cylinder portion 3A is blind, however, a fluid passage 17 does not extend to the front end face portion. At the inner part of the passage 17, six to eight through holes 18 are radially bored through the front end cylinder portion 3A of the plug 3 so that they communicate with the opening 15 of the flow passage 14. When the plug 3 is fitted in the plug hole 9, the through holes 18 are opposed to the opening 15. Annular grooves 19 and 20 are formed, respectively, at a predetermined position on the inner peripheral surface of the inner cylinder 6, which has the opening 15 and the through holes 18, and at a predetermined position on the outer peripheral surface of the plug 3. Thus, the opening 15 and the holes 18 can communicate with one another even if they are circumferentially shifted at any angles.

Numeral 23 denotes a socket type locking mechanism for releasably fixing the plug 3 and the housing 40. The socket 23 includes an annular groove 24 formed on the outer peripheral surface of the housing 40, a locking ball 25, a sleeve 29, and a compression coil spring 28. An outer cylinder 26 is threadedly fitted on the front portion of the rear end cylinder portion 3B of the plug 3. Several tapered holes 27 for receiving the locking ball 25 are formed in the cylinder 26 so as to face the annular groove 24 of the housing 40. The locking ball 25 is fitted in any of the tapered holes 27 so that it can project or retreat in the radial direction. A backup face 29A and a release space 29B for the locking ball 25 are formed adjacent to each other on or under the inner peripheral surface of the sleeve 29, which is slidably fitted on the outer peripheral surface of the outer cylinder 26. As the sleeve 29 is resiliently urged in the axial direction by the coil spring 28, the backup face 29A of the sleeve 29 centripetally presses the locking ball 25. If the sleeve 29 is pulled against the urging force of the spring 28, the ball 25 is released into the release space 29B. The sleeve 29 binds the locking ball 25 in a state such that the ball 25 radially inwardly projects from the inner peripheral surface of the outer cylinder 26 when the sleeve 29 engages a stopper 30.

The following is a description of the operation of the above embodiment.

When the plug 3 is not in the hole 9, the valve head portion 11A of the valve body 11 resiliently urged by the compression coil spring 12 engages the valve seat 10, so that the valve chamber 8 is closed by the element 11. Thus, the inside of the pressure vessel 2 is isolated from the outside.

In taking out the high-pressure fluid from the pressure vessel 2, the plug 3 is inserted into the hole 9 of the housing 40, so that its front end portion causes the stem portion 11B of the valve body 11 to retreat against the urging force of the compression coil spring 12. If the valve head portion 11A of the element 11 goes away the shortest distance from the valve seat 10, the high-pressure fluid, passed between the head portion 11A and the seat 10, flows through the flow passage 14 to be discharged from the opening 15. Thus, the fluid is delivered into the fluid passage 17 of the plug 3. At this time, the pressure of the high-pressure fluid acts only on the inner cylinder 6 which is fixed in the housing 40, and the flowing direction of the fluid discharged from the cylinder 6 is perpendicular to the direction of insertion of the plug 3. Therefore, the high-pressure fluid discharged from the opening 15 into the fluid passage 17 of the plug 3 can never press the front end face portion of the plug. Thus, the fluid discharged from the opening 15 does not act as a force to push back the plug 3 which is urged to be inserted into the plug hole 9. Since the opening 15 and its surroundings are sealed by means of the O-rings 13 and 16, moreover, the high-pressure fluid can pass through the annular grooves 19 and 20 to reach the through holes 18 without leaking out. Thus, the fluid can smoothly flow toward the fluid passage 17 of the plug 3.

In this state, the plug 3 is subjected to a force in the thrust direction attributable to a small reaction force of the compression coil spring 12 and a back pressure from the high-pressure fluid received by the valve head portion 11A. However, the reaction force is practically negligible, and the back pressure can be minimized by forming the head portion 11A into a shape such that its cross-sectional area is reduced toward the front side (pressure vessel side) thereof, e.g., the shape of a truncated cone.

The pipe for the high-pressure fluid can be disconnected by first pulling the sleeve 29 against the urging force of the compression coil spring 28, and then drawing out the plug 3. In the process of drawing out the plug 3, the valve head portion 11A of the valve body 11 comes into contact with the valve seat 10 in a very short time, so that the high-pressure fluid can never leak out. This pipe connector may be also arranged so that a branch passage communicating with the flow passage 14 is formed in part of the housing 40, and a safety valve is disposed in the branch passage, whereby the pressure of the high-pressure fluid is controlled.

Figure 2:
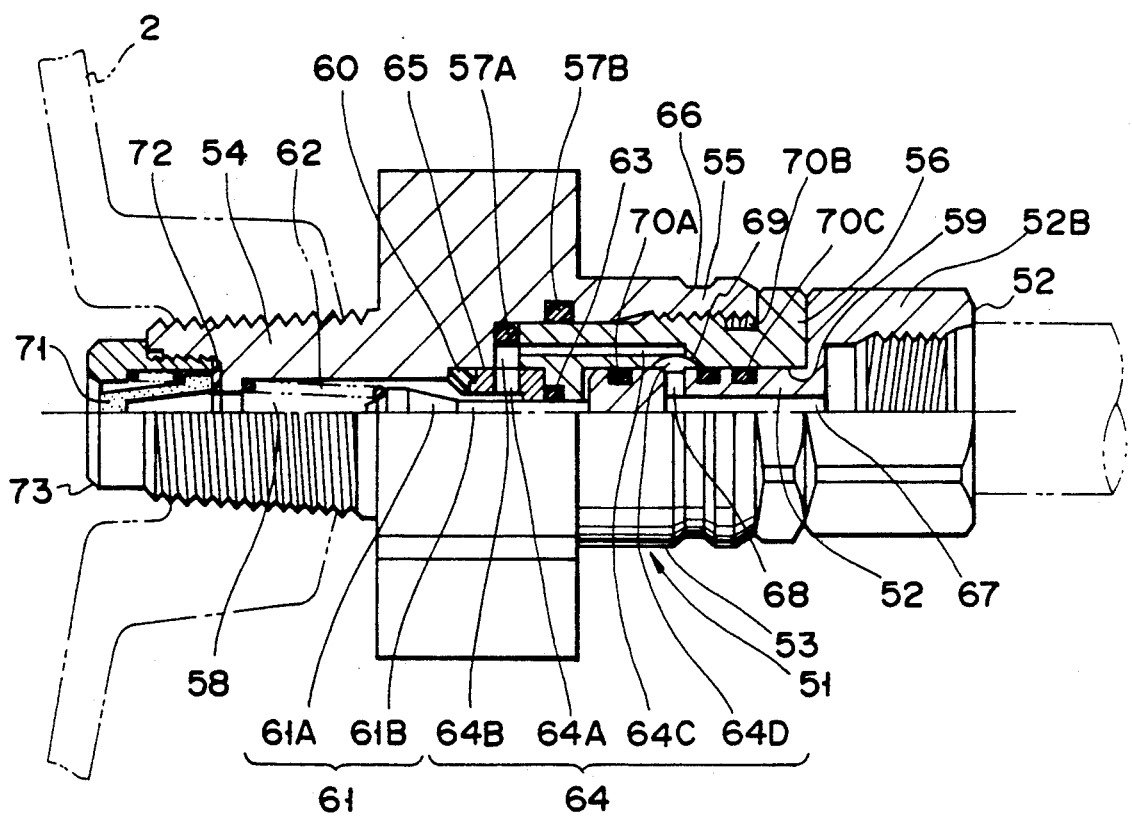

FIG. 2 shows a pipe connector 51 according to the second embodiment of the invention. A male screw of an inner cylinder 56 is threadedly engaged with a female screw 55 formed on the inner peripheral surface of the front portion of an outer cylinder 54, thus constituting a housing 53. A valve chamber 58 is formed in the rear portion of the outer cylinder 54 secured to the vessel 2, and the inner cylinder 56 has a plug hole 59.

A ring-shaped valve seat 60 is fixed to the inner part of the valve chamber 58, and a valve body 61 is disposed in front of the seat 60. The body 61 has a valve head portion 61A in the shape of a truncated cone, resiliently urged to engage the valve seat 60 by means of a compression coil spring 62, and a valve stem portion 61B extending from the head portion 61A and penetrating the seat 60. The stem portion 61B penetrates the inner cylinder 56 for sliding motion to reach the plug hole 59. An O-ring 63 is provided on the inner peripheral surface of the inner cylinder 56 which faces the valve stem portion 61B, whereby a high-pressure fluid is prevented from leaking along the stem portion 61B.

Numeral 64 denotes a flow passage for the high-pressure fluid, which is composed of a large number of through holes 64A, a passage 64B, a through hole 64C, and a circumferential groove 64D. The holes 64A are radially bored through a fixed ring 65 of the valve seat 60. The passage 64B is defined between the front end portion of the inner cylinder 56 and the inside space of the outer cylinder 54. The hole 64C axially extends from the font end face side of the cylinder 56. The groove 64D connects the through hole 64C and the inner peripheral surface of the inner cylinder 56. When a front end cylinder portion 52A of a plug 52 presses the valve body 61 to disengage the valve head portion 61A from the valve seat 60, in inserting a plug 52 into the plug hole 59, the high-pressure fluid passed between the seat 60 and the head portion 61A is detoured from the sliding portion of the valve stem portion 61B toward the outer periphery. Thereupon, the fluid is guided to the inner peripheral surface of the plug hole 59 from the outside with respect to the radial direction thereof. When the high-pressure fluid is thus introduced (from the valve body side) into the plug hole 59 via the flow passage 64, it applies no force of pressure to the front end face portion of the plug 52.

In order to prevent the high-pressure fluid from leaking out through the gap between the outer peripheral surface of the inner cylinder 56 and the inner peripheral surface of the outer cylinder 54, a packing 57A and an O-ring 57B are provided to seal the front end portion and peripheral surface portion of the inner cylinder 56 of the housing 53. The plug 52 includes a front end cylinder portion 52A and a rear end cylinder portion 52B. The cylinder portion 52A is inserted in the inner cylinder 56 which has the plug hole 59. The cylinder portions 52A and 52B internally communicate with each other, thus forming a fluid passage 67. In the front end cylinder portion 52A, however, the passage 67 does not extend to the front end face portion. That portion of the lateral face of the cylinder portion 52A in which the innermost recess of the passage 67 is situated communicates with the circumferential groove 64D by means of a plurality of through holes 68 radially bored through the lateral face portion. When the plug 52 is fitted in the plug hole 59, the through holes 68 are opposed to the circumferential groove 64D of the flow passage 64, and a circumferential groove 69 is formed along the openings of the holes 68 on the outer peripheral side.

Three O-rings 70A, 70B and 70C are fitted on the outer peripheral surface of the plug 52, one on one side of the circumferential groove 69 and the other two on the other side. The distal end side (high-pressure side) of the plug 52 is sealed by means of the O-ring 63 for sealing the outer peripheral surface of the valve stem portion 61B and the O-rings 70A. The proximal end side (low-pressure side) of the plug 52 is sealed by means of the two other O-rings 70B and 70C. This sealing mechanism serves to prevent the high-pressure fluid, discharged from the circumferential groove 64D toward the outer peripheral surface of the plug 52, from leading out.

A strainer 73 is attached to the distal end portion of the outer cylinder 54 on the side of the valve chamber 58, whereby a cup-shaped filter 71 is resiliently pressed against a packing 72. Thus, foreign matters, along with the high-pressure fluid, is prevented from leaking from the pressure vessel 2.

The plug 52 is mounted inside a main body (not shown). Provided outside the main body is a locking mechanism, which has the same function as the locking mechanism of the first embodiment located on the plug side. The plug 52 can be held between the housing and the plug body by engaging a locking ball of the locking mechanism with a circumferential groove 66 on the outer peripheral surface portion of the housing 53.

The following is a description of the operation of the second embodiment.

When the plug 52 is not in the plug hole 59, the valve head portion 61A of the valve body 61 resiliently urged by the compression coil spring 62 engages the valve seat 60, so that the valve chamber 58 is closed by the element 61. Thus, the inside of the pressure vessel 2 is isolated from the outside.

In taking out the high-pressure fluid from the pressure vessel 2, the plug 52 is inserted into the plug hole 59 of the housing 53, so that its front end portion causes the stem portion 61B of the obturating element 61 to retreat against the urging force of the compression coil spring 62. If the valve head portion 61A of the body 61 goes away the shortest distance from the valve seat 60, the high-pressure fluid, passed between the head portion 61A and the seat 60, flows through the flow passage 64 to be discharged into the circumferential groove 69 on the outer peripheral surface of the plug 52. Thus, the fluid is delivered into the fluid passage 67 of the plug 52. At this time, the pressure of the high-pressure fluid acts only on the inner cylinder 56 which is fixed in the housing 53, and the flowing direction of the fluid discharged from the cylinder 56 is perpendicular to the direction of insertion of the plug 52. Therefore, the high-pressure fluid discharged from the flow passage 64 into the fluid passage 67 of the plug 52 can never press the plug. Thus, the fluid discharged from the passage 64 does not act as a force to push back the plug 52 which is urged to be inserted into the plug hole 59. Since the circumferential groove 64D and its surroundings are sealed by means of the O-rings 70A to 70C, moreover, the high-pressure fluid can reach the through holes 68 without leaking out, and can smoothly flow toward the fluid passage 67 of the plug 52.

In this state, the plug 52 is subjected to a force in the thrust direction attributable to a small reaction force of the compression coil spring 62 and a back pressure from the high-pressure fluid received by the valve head portion 61A. However, the reaction force is practically negligible, and the back pressure can be minimized by forming the head portion 61A into a shape such that its cross-sectional area is reduced toward the front side (pressure vessel side) thereof, e.g., the shape of a truncated cone.

The pipe for the high-pressure fluid can be disconnected by only drawing out the plug 52. In the process of drawing out the plug 52, the valve head portion 61A of the obturating element 61 comes into contact with the valve seat 60 in a very short time, so that the high-pressure fluid can never leak out.

Although illustrative embodiments of the present invention has been described in detail, it is to be understood that the invention is not limited to those precise embodiments, and that various changes and modifications may be effected therein by one skilled in the art without departing from the scope or spirit of the invention.

For example, the housing is not limited to the double structure including the inner and outer cylinders, and may be formed using a single cylinder. Further, the ball locking mechanism for releasably fixing the plug and the housing may be provided on the plug side or omitted.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A pipe connector for a high-pressure fluid pipe, which is detachably connected to a high-pressure fluid source, comprising:

a socket having a first end portion connected to the high-pressure fluid source; a second end portion; a socket housing connecting the first and second end portions together and including a valve chamber located at a first end portion and a plug hole located at a second end portion; a valve seat disposed in the valve chamber; and a valve body having a valve stem portion movable in the valve chamber between a position at which the valve body engages with the valve seat and a position located away from the valve seat; and a plug having a cylindrical front end portion which can be inserted into the plug hole; and a fluid passage capable of communicating with the pipe, said plug being adapted to press the valve stem portion and move the valve body to the position located away from the valve seat when the plug is inserted through the second end portion into the plug hole, wherein said socket housing includes communication means for allowing communication between the valve chamber and a front region of the plug hole when the valve body moves to the position located away from the valve seat, said communication means including an axial passage which extends through the socket housing in parallel to the valve stem portion; a first radial passage which opens into the valve chamber at a position closer to the plug hole than the valve seat and which allows the axial passage to communicate with the front region of the plug hole; and wherein said plug includes an end wall which axially closes a distal end of the cylindrical front end portion inserted into the plug hole; and at least one through-hole which communicates with the fluid passage at a position axially corresponding to the first radial passage located on a plug hole side when the cylindrical front end portion is inserted into the plug hole; and further wherein one of said plug and socket includes a plurality of seal rings which prevent the high-pressure fluid from leaking through the plug hole and the outer wall of the cylindrical front end portion.

2. The pipe connector according to claim 1, wherein said valve seat is ring-shaped, said valve body has a valve head portion adapted to engage the valve seat, and said valve stem portion extends from the valve head portion and penetrates the ring-shaped valve seat.

3. The pipe connector according to claim 2, comprising a spring disposed in the housing and urging the valve body toward the valve seat.

4. The pipe connector according to claim 3, wherein said housing includes an outer cylinder connected to the high-pressure fluid source and an inner cylinder hermetically connected to the inside of the outer cylinder, and said communication means includes an axial passage, formed inside the inner cylinder, and two radial passages individually connecting the bore and the axially opposite end portions of the axial passage.

5. The pipe connector according to claim 4, comprising a fixed ring disposed between the valve seat and the inner cylinder, said fixed ring having a through hole communicating with the radial passage formed on the first end portion side of the communication means.

6. The pipe connector according to claim 5, wherein said plug has a plurality of O-rings for preventing the high-pressure fluid from leaking out from between the inner peripheral surface of the inner cylinder and the outer peripheral surface of the plug.

7. The pipe connector according to claim 6, wherein said housing has a strainer on the first end portion side thereof.

8. The pipe connector according to claim 7, wherein said plug has a blind end portion inserted in the plug hole.

9. The pipe connector according to claim 3, wherein said socket housing includes an outer cylinder detachably connected to the high-pressure fluid source and having a female screw located on a communication means side and an inner cylinder having a male screw which is formed on the outer circumference thereof and partially engageable in a radial direction, said axial passage of the communication means extending through the male and female screws.

10. The pipe connector according to claim 9, comprising a locking mechanism for fixing the plug to the housing.

11. The pipe connector according to claim 10, wherein said locking mechanism includes an outer cylinder having one end threadedly engaged with the outer peripheral portion of the plug, the other end covering the outer peripheral portion of the housing, and at least one radial hole formed at the other end; a locking ball housed in the radial hole for radial movement; a sleeve fitted on the outer cylinder for axial movement and adapted to press the locking ball radially inward, thereby causing the locking ball to engage the outer peripheral surface of the housing, when moved to the other end side, and to move the locking ball radially outward when moved to the one end side; and a compression coil spring for urging the sleeve toward the other end.

12. The pipe connector according to claim 11, wherein said outer cylinder of the housing has an annular groove on the outer peripheral portion thereof capable of receiving the locking ball.

13. The pipe connector according to claim 12, wherein said radial hole of the outer cylinder of the locking mechanism is tapered radially inward.

14. The pipe connector according to claim 13, wherein said plug has a blind end portion inserted in the plug hole.

15. A pipe connector for a high-pressure fluid pipe for connecting a high-pressure fluid source to the pipe through which a high-pressure fluid is supplied, comprising:
a housing having a first end portion connected to the high-pressure fluid source, a second end portion, and a bore formed of a valve chamber located on the first end portion side and a plug hole located on the second end portion side, said bore connecting the first and second end portions;
a valve seat disposed in the valve chamber;
a valve body having a valve stem portion located in the plug hole and movable between a position in engagement with the valve seat and a position off the valve seat;
a sealing ring located in the plug hole and adapted to seal the outer peripheral surface of the valve stem portion;
communication means disposed in the housing, for communicating the bore portion between the valve seat and the sealing ring to the bore portion on the second end portion side with respect to the sealing ring when the valve body is situated in the position off the valve seat; and
a plug having a fluid passage capable of communicating with the pipe and adapted to press the valve stem portion to move the valve body to the position off the valve seat when the plug is inserted in the plug hole,
said plug having at least one radial through hole adapted to communicate with the communication means when the plug is inserted in the plug hole.

* * * * *